(12) United States Patent
Killeen et al.

(10) Patent No.: US 7,151,154 B2
(45) Date of Patent: *Dec. 19, 2006

(54) GRAFT POLYMER CURATIVES AND POLYURETHANES FORMED THEREFROM

(75) Inventors: Kelly A. Killeen, Lexington, KY (US); Jing X. Sun, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/756,494

(22) Filed: Jan. 13, 2004

(65) Prior Publication Data

US 2005/0154174 A1    Jul. 14, 2005

(51) Int. Cl.
*C08G 18/63* (2006.01)

(52) U.S. Cl. ............................. 528/75; 528/28; 528/59; 528/85; 526/224; 526/318; 526/279; 428/369; 428/906; 399/279; 525/66

(58) Field of Classification Search ................ 528/28, 528/59, 75, 85; 526/224, 279, 318; 428/369, 428/906; 399/279; 525/66
See application file for complete search history.

(56) References Cited

U.S. PATENT DOCUMENTS

| | | | |
|---|---|---|---|
| 3,823,201 A | 7/1974 | Pizzini et al. | |
| 4,111,861 A | 9/1978 | Godlewski | |
| 4,210,727 A | 7/1980 | Preston et al. | |
| 4,258,148 A | 3/1981 | Chandalia et al. | |
| 4,359,542 A | 11/1982 | Chandalia et al. | |
| 4,359,571 A | 11/1982 | Bernstein et al. | |
| 4,504,313 A | 3/1985 | Robertson | |
| 4,521,546 A | 6/1985 | O'Connor et al. | |
| 4,818,804 A * | 4/1989 | Kuriyama et al. | 526/211 |
| 5,021,506 A | 6/1991 | Gastinger et al. | |
| 5,070,141 A | 12/1991 | Gastinger et al. | |
| 5,223,570 A | 6/1993 | Huang et al. | |
| 5,250,581 A | 10/1993 | Gastinger et al. | |
| 5,262,486 A | 11/1993 | Telser et al. | |
| 5,733,973 A | 3/1998 | Wamprecht et al. | |
| 5,810,705 A | 9/1998 | Mimura et al. | |
| 5,843,577 A | 12/1998 | Ouhadi et al. | |
| 5,925,893 A | 7/1999 | Ishii et al. | |
| 6,011,090 A | 1/2000 | Sakogawa et al. | |
| 6,035,172 A | 3/2000 | Mimura et al. | |
| 6,142,922 A | 11/2000 | Yoshikawa et al. | |
| 6,265,457 B1 | 7/2001 | Dolgopolsky et al. | |
| 6,414,081 B1 | 7/2002 | Ouhadi | |
| 6,489,382 B1 | 12/2002 | Giesecke et al. | |
| 6,515,077 B1 | 2/2003 | Su et al. | |
| 2005/0154102 A1 | 7/2005 | Gopalenanayanan et al. | |
| 2005/0154149 A1 | 7/2005 | Beach et al. | |
| 2005/0154173 A1 | 7/2005 | Beach et al. | |

FOREIGN PATENT DOCUMENTS

| | | | |
|---|---|---|---|
| JP | 04272917 | * | 9/1992 |
| JP | 06016997 | * | 1/1994 |

OTHER PUBLICATIONS

Oertel, Polyurethane Handbook, 1985, pp. 430-432.*
Nair et al, Polyurethanes with Polybutyl Acrylate Grafts via Macromonomer Technique, European Polymer Jrnl.,33(1), 1997, pp. 89-95.*

* cited by examiner

*Primary Examiner*—Rachel Gorr
(74) *Attorney, Agent, or Firm*—Dinsmore & Shohl, LLP

(57) ABSTRACT

Graft polymer curatives comprise a side chain having an average molecular weight of at least about 500, a main chain having an average molecular weight of less than about 200, and diol functionality on the main chain. The graft polymer curative is formed via free radical polymerization of at least one ethylenically-unsaturated monomer with a chain transfer agent or initiator.

20 Claims, No Drawings

GRAFT POLYMER CURATIVES AND POLYURETHANES FORMED THEREFROM

FIELD OF THE INVENTION

The present invention relates to graft polymer curatives and their methods of manufacture. The invention further relates to polyurethane elastomers and methods of manufacturing polyurethane elastomers using the inventive graft polymer curatives. Further, the invention allows manufacture of elastomeric rolls suitable for use in image forming systems, for example electrophotographic printing applications.

BACKGROUND OF THE INVENTION

Because of their wide availability, relative inexpense, and versatility, polyurethane elastomers with specific physical properties have been adapted for use in a diverse array of technical applications. One such application is as conductive and semi-conductive members in image forming devices. It has been desirable to develop more compact image forming devices having a smaller device footprint. Consequently, the need for development of reduced-geometry printer components arose. However, it has been discovered that the necessary size adaptations altered the functioning of various elastomeric components with respect to, for example, required compressive forces, nip widths, resiliency, triboelectric charging capacity, and rotational torque. Utilization of reduced-geometry components having the same elastomeric properties as the originally-sized components often results in the occurrence of unacceptable print variations and distortions in the final printed product. Hence, new materials adapted to confer physical properties which compensate for the reduced geometry and restore the quality of the final printed product are needed. In particular, such materials are needed with respect to the roll components of electrophotographic printers.

The polyurethane elastomers may be formed via one-shot or prepolymer methods. Utilizing a prepolymer synthesis route, the polyurethane is formed by sufficiently curing a urethane mixture typically comprising a polyurethane prepolymer, and one or more curatives (typically chain-extenders and/or cross-linkers), as well as various solvents, catalysts, and other additives depending on the need. Curatives must comprise at least di-functionality to act as chain extenders, and tri-functionality to act as cross-linkers or to promote networking within the matrix, functional groups being generally defined as groups comprising active hydrogens, for example, amines or hydroxyls.

Reaching a desired elastomer hardness by manipulating selection of the urethane prepolymer and curative components of the final elastomer often results in unacceptable compromises in other properties of the elastomer. Typically, plasticizers are used to reduce the hardness of polymeric elastomers such as cast polyurethanes. However, plasticizing additives are not chemically bound into the polymer matrix and are therefore free to migrate throughout, including to the surface of a roll formed therefrom, resulting in unacceptable print variations in electrophotographic print applications. Hence, there is clearly a need for soft polyurethane elastomers that also maintain a suitably low compression set, and for methods of manufacturing them. In addition, it would be advantageous to provide inexpensive, more versatile graft polymer curatives which could confer desirable property profiles to polyurethane elastomers required by particular applications.

SUMMARY OF THE INVENTION

Accordingly, it is an object of the present invention to provide graft polymer curatives. It is a further object to provide polyurethane elastomers, including those which are soft yet maintain suitably low compression set, and methods for manufacturing the same.

In one embodiment, the invention is directed to methods for manufacturing graft polymer curatives. The graft polymer curatives comprise a side chain having a number average molecular weight (Mn) of greater than about 500 and a main chain having an Mn of less than about 200 and diol functionality. The method comprises conducting free radical polymerization of at least one ethylenically unsaturated monomer with at least one diol-functional initiator or chain transfer agent. In a more specific embodiment, the diol-functional chain transfer agent is a mercaptan diol.

In another embodiment, the invention is directed to graft polymer curatives comprising a side chain having an Mn of greater than about 500 and a main chain having an Mn of less than about 200 and diol functionality. The graft polymer curatives are formed via free radical polymerization of at least one ethylenically-unsaturated monomer with a diol-functional chain transfer agent or initiator. In a more specific embodiment, the chain transfer agent is a mercaptan diol.

In yet another embodiment, the invention is directed to methods for manufacturing polyurethane elastomers. Generally, polyurethanes may be formed from a reaction of diisocyanates with dihydroxy compounds. This may include prepolymer or one-shot routes. The inventive methods contemplate the formation of the polyurethanes via any route commonly known in the arts. In one specific embodiment, the methods comprise forming a polyurethane mixture comprising urethane prepolymer, at least one graft polymer curative, and optionally, at least one linear polymer curative. The polyurethane mixture is subject to conditions sufficient to effect curing. In this embodiment, the graft polymer curative comprises a side chain having an Mn greater than about 500, and a main chain having an Mn of less than about 200. The main chain exhibits diol functionality. The graft polymer curative is formed via free radical polymerization of at least one ethylenically unsaturated monomer with a diol-functional chain transfer agent or initiator. In a more specific embodiment, the chain transfer agent is a mercaptan diol.

In a further embodiment, the invention is directed to a polyurethane elastomer. The polyurethane mixture comprises urethane prepolymer, at least one graft polymer curative, and optionally at least one linear polymer curative. The graft polymer curative comprises a side chain having an Mn greater than about 500, a main chain having an Mn less than about 200 and diol functionality. The graft polymer curative is formed via free radical polymerization of at least one ethylenically-unsaturated monomer with a diol-functional chain transfer agent or initiator. In a more specific embodiment the chain transfer agent is a mercaptan diol.

In yet another embodiment, the invention is directed to a roll suitable for use in electrophotographic image forming devices comprising polyurethane elastomer.

DETAILED DESCRIPTION

In one embodiment, the invention is directed to graft polymer curatives. It is well-known in the polymer chemistry arts that copolymers have specific properties which are dependent on how the monomers which comprise the copolymer are arranged with respect to one another. Copolymers comprised of the same ratio of monomeric species can have a wide variety of molecular architectures. Such polymeric isomers may have entirely different physical properties depending on that architecture. In particular, a copolymer may exhibit unique surface or bulk properties due to microphase separation, which will impact the compatibility, permeability and solid state morphology of the polymer. Therefore, a polymer comprising a block structure may have totally different surface and/or bulk properties than a polymer comprising the non-block or random isomer in the same monomeric proportions.

Used herein, the primary polymer architectural forms include linear and branched polymeric forms. Whether given monomers are arranged in linear or branched architecture has an impact on the polymer properties. Linear polymers generally comprise straight chain polymer units. Branched polymers are typically comprised of a main chain and branches or side chains pendant to the main chain. The repeating units of branched polymers are not linked solely in a linear array, either because at least one of the monomers has functionality greater than two or because the polymerization itself produces branching points. Copolymers are comprised of more than one monomeric species. Copolymers may be either random, wherein the two or more monomers used to form the copolymer are randomly dispersed throughout the copolymer (e.g. ABAABABBA BA . . . ), or block, wherein a plurality of repeating units of each monomer form respective blocks of that monomer (e.g. AA . . . BB . . . ). A graft polymer is typically a branched arrangement with a main chain and one or more pendant side chains grafted to the mainchain as discrete units rather than as monomers which polymerize during curing.

One embodiment of the present invention is directed to a method for manufacturing a graft polymer curative comprising free radical polymerization of at least one ethylenically unsaturated monomer with at least one diol-functional chain transfer agent or initiator, wherein the graft polymer curative has a high molecular weight side chain, defined as having an Mn of greater than about 500, a low molecular weight main chain, defined as having an Mn of less than about 200, and the main chain exhibits diol functionality. In one specific embodiment, the chain transfer agent is a mercaptan diol, and in an even more specific embodiment the mercaptan diol is 3-mercpato-1,2-propane diol. It is the main chain that is actually incorporated into the polymeric backbone of a urethane to form the end product polyurethane elastomer, while the side chain remains independently pendant, or, in some embodiments, forms additional linkages via optional functional groups on the side chain.

The difference in the molecular weights of the side chain and main chain of the inventive graft polymer curative is important when the curative is used, for example, in forming a polyurethane elastomer. One skilled in the art of polymer chemistry will recognize that molecular weight determinations are complex with polymers. First, it is very difficult to terminate growth of all polymer molecules at the same size point, hence molecular weights of polymers are reported as average molecular weights. Second, conventional measurement techniques work best with small polymers. The present inventive graft polymers may be used as curatives which will covalently bond into a final elastomeric matrix, forming the inventive elastomer. Hence, they are relatively small in size, typically, but not necessarily, with a maximum Mn of about 25,000. Conventional molecular weight determination techniques are therefore sufficiently accurate.

Additionally, molecular weight values depend somewhat on the method of measurement. Molecular weights reported herein are number average molecular weights, Mn, which is a fraction of the number of molecules of each weight in the sample. The Mn is measured using the Waters GPC 150 C+ run in tetrahydrofuran (THF) solvent relative to polystyrene standards.

Tg is the glass transition temperature, which is the point where an amorphous polymer transitions between glass-like properties and assumes those more commonly identified with rubber. It is a fundamental characteristic that relates to polymer structure. The transition is accompanied by more long-range molecular motion, greater rotational freedom and consequently more segmental motion of the chains. The polymeric embodiments of the present invention typically have a Tg, below room temperature and specific embodiments have a Tg below 0° C. Tg values as described herein can be measured using standard DSC techniques.

The present inventive methods comprise formation of the inventive graft polymer curatives via free radical polymerization. As used herein, "free radical polymerization" is meant to include any basic chain polymerization in which the active growth centers are free radicals. Functionality, as used herein, is the number of sites on a molecule available for bonding to other molecules under the specific conditions of the polymerization reaction. Functionality is not used in connection with the individual steps of any reaction sequence. Functionality is also defined only for a given reaction. For example, 1,3 butadiene may have a functionality of 2 or 4, depending on the particular double bond addition reaction.

The present inventive methods, curatives and elastomers comprise the use of ethylenically unsaturated monomers, i.e. monomers comprising alkenyl (—CH=CH—) substituents. The alkene double bond may be polymerized in chain-growth reactions in which the active site is a radical, depending on the inductive and resonance characteristics of substituents in the vinyl monomer. For purposes herein, the functionality of the alkenyl double bond is defined as 2, though there is a single reactive site.

Broadly, the present invention contemplates that any monomer which can be polymerized via the radical pathway is capable of being used in the synthesis of the graft polymer curative, so long as it provides the requisite softness and compression set. The graft polymer side chains may be homo- or co-polymers. The present inventive graft polymers, however, should exhibit relatively low cross-linking density and, therefore, the monomer selection should typically exhibit a functionality of 2. However, particular applications may require some degree of cross-linking, or some latent functionality may exist, such that methods, curatives and elastomers comprising monomers with functionality greater than 2, or those with more, though less reactive functional groups should not necessarily be excluded from being within the scope of the invention. Monomers for the composition of the inventive graft polymer curatives are therefore contemplated to be selected with the intention of keeping crosslinking at a minimum, depending on the final application.

In some embodiments of the inventive methods, curatives, elastomers and rolls, the ethylenically unsaturated monomer comprises at least one acrylate monomer or styrene monomer. In more specific embodiments, the ethylenically unsaturated monomer comprises at least one acrylate monomer. Even more specific embodiments are directed to ethylenically unsaturated monomers comprising at least one alkyl or substituted alkyl acrylate. Suitable substituents are not limited and may include, for example, hydrocarbon groups or groups containing one or more hetero-atoms, for example, halogen, O, Si or combinations thereof More specific embodiments are directed to graft polyacrylate curatives comprised of a single ethylenically unsaturated monomeric species, for example, n-butylacrylate or 2-ethylhexylacrylate. Another specific embodiment is directed to graft polyacrylate curatives comprising a copolymer system containing two or more ethylenically unsaturated monomeric species. The scope of the invention is also contemplated to include graft polymer curatives comprising copolymer systems comprising greater than two ethylenically unsaturated monomeric species. A further specific embodiment is directed to graft polyacrylate curatives comprising side chain functionality in addition to the requisite diol functionality of the main chain. One way this is accomplished is via selection of at least one monomer comprising at least one additional hydroxyl, for example, 2-hydroxyethylmethacrylate, but any such functional monomer is suitable to comprise this embodiment.

A further specific embodiment of the present invention is directed to silyl or flourinated acrylate monomeric species due to their high hydrophobicity, and surface energy modification ability. A non-limiting example of this acrylate comprises 3-(tris(trimethylsiloxy)silyl)propyl methacrylate. Another specific embodiment contemplates the use of monomers comprising more hydrophilic ethers such as polyethylene glycol and polypropylene glycol, for example, poly(propylene glycol)methylether acrylate.

The manufacture and use of graft polyacrylate diols is advantageous, due to the wide variety of inexpensive monomers available for their synthesis, and because graft polymer curatives comprised of polyacrylate diols confer the desirable hardness and low compression set often required by specific printer art applications. Compression set is the elastomeric property that reflects the ability of the elastomer to recover its original dimensions after compression. This physical parameter is particularly important in elastomeric rolls for use in printing applications wherein the rolls may typically be held for extended periods of time in nips at contact points, from which they must substantially fully recover in order to maintain good print quality.

The sequence of reactions which comprise a successful free radical polymerization according to the invention must include an initiation, propagation and termination. That is, the polymerization must be initiated, monomers must be added consecutively to the growing polymer, and the growth must be terminated either inherently or by a contrived means. For initiation, free radicals must be introduced into the system to start the reaction.

Chain transfer processes are a means to control the molecular weight distributions of the polymer. Chain transfer may be a characteristic of the particular polymerization or it may be deliberately contrived to control the polymer molecular weight. In addition, in some embodiments of the present invention, the chain transfer agent introduces the functionality.

The only specific requirement of the present inventive method with respect to the free radical polymerization is the use of a low molecular weight diol to terminate the polymer chain. This is necessary in order for the main chain of the graft polymer curative to exhibit the requisite diol functionality. The diol can come from the initiator, or a chain transfer agent, or an independent source. Compounds which comprise any or all of these classes of compounds are well-known in the polymer arts. The main chain must exhibit diol functionality in order to provide the links for grafting onto the urethane backbone. The pendant portion of the graft is the high molecular weight side chain. One embodiment of the present invention contemplates a chain transfer agent or initiator as the source of the terminal diol. A specific embodiment is directed toward the use of a diol-functional mercaptan chain transfer agent. A more specific embodiment utilizes a mercapto-substituted alkanediol chain transfer agent. An even more specific embodiment is directed toward the use of 3-mercapto-1,2-propanediol as the chain transfer agent and source of the terminal diol. A specific process embodiment comprises incorporation of the diol functionality onto the polyacrylate chain by the use of the chain transfer agent 3-mercapto-1,2-propanediol during the polymerization of acrylic monomers.

The inventive graft polymer curatives are comprised of a low molecular weight main chain and a high molecular weight side chain. The main chain is the diol-terminated portion, and the side chain is the free-radically polymerized portion. The diols on the graft curative then provide the active hydrogens for linking the urethane prepolymers and other curatives in the urethane mixture solution to form the final polyurethane elastomer product. In this context, "low molecular weight" is defined as having an Mn of less than 200. In one embodiment of the present invention, the graft polymer curative comprises a high molecular weight side chain, defined as having an Mn of greater than about 500. In a more specific embodiment, the high molecular weight side chain has an Mn of from greater than about 500 to about 25,000, and in an even more specific embodiment, the high molecular weight side chain has an Mn of from about 1000 to about 10,000. Embodiments directed to the manufacture of these graft polymer curatives comprise free radical polymerization of monomers to form graft polymer curatives comprising diol terminated main chains with pendant side chains reflecting these average molecular weight ranges. Embodiments directed to polyurethane elastomers and the manufacture of such polyurethane elastomers employ the inventive graft polymer curatives as described.

One embodiment of the invention is directed to methods for manufacturing polyurethane elastomers, and these methods can be employed to provide polyurethanes exhibiting a hardness and compression set suitable for specific applications. The polyurethane elastomers are formed from urethane mixtures comprising urethane prepolymer, at least one graft polymer curative, and optionally, at least one linear polymer curative, and subjecting the mixture to conditions sufficient to effect curing. A polyurethane mixture is a substantially uncured mixture of the ingredients intended to form the final polyurethane, including the backbone forming polymers and/or prepolymers, the curatives, and other desired additives. The ordinary person skilled in the art of polymer science will readily comprehend what is required to effect sufficiency of cure, and all necessary curing techniques are well-known in the art.

The polyurethane mixture is contemplated to include other additives as desired. For example, U.S. Pat. No. 5,804,114 to Janes et al. teaches the addition of a powder of a conductive metal salt to catalyze desired cure and post-cure oxidation reactions; U.S. Pat. No. 5,874,172 to Beach et al. teaches the addition of antioxidant ingredients such as BHT, and the use of hydrolytic stabilizers, such as triisopropanolamine, to counter the degradation effects of acidic material; U.S. Pat. No. 5,248,560 to Baker et al. teaches the addition of copper chloride and silicone oil to the mixture; and U.S. Pat. No. 6,042,946 to Massie II, et al. teaches the addition of antimony doped tin oxide with or without carbon black. These patents are all incorporated herein by reference, though their inclusion should not be construed to be limiting as to the mixture additives, but merely exemplary.

In a specific embodiment, the urethane mixture comprises both the inventive graft polymer curative and a linear polymer curative in a proportion, such that the final polyurethane elastomer reflects that proportion. By varying the amount of polymer in linear architecture to the amount in graft architecture, one can vary the hardness and compression set of the final polyurethane elastomer to within desired ranges. In a more specific embodiment, the method further comprises decreasing a proportion of linear polymer, resulting in a decrease in the compression set relative to the hardness of the final elastomer product. Conversely, an additional method comprises increasing a proportion of linear polymer, resulting in an increase in the compression set relative to the hardness of the final elastomer product. In a specific embodiment of the inventive polyurethane elastomer, the proportion of the graft polymer curative, as incorporated into the polyurethane elastomer matrix, comprises from about 1% to about 30% by weight of the polyurethane elastomer. In a further specific embodiment of the inventive polyurethane elastomer, the proportion is adjusted so that the graft polymer curative comprises from about 8% to about 20% by weight of the polyurethane elastomer.

In one embodiment, due to the needs of particular laser printer applications, it is desirable to develop a polyurethane elastomer exhibiting decreased hardness as compared with conventional polyurethanes, while retaining the compression set of polyurethane elastomers previously utilized in such applications. For purposes of assessing the relevant physical parameters of the present invention, hardness is measured in Shore A according to ASTM D2240-86, and compression set is reported as 25% compression set, measured according to ASTM D395-89, method B, exposed for 22 hours at 70° C.

One embodiment of the present invention is directed to rolls suitable for use in image forming devices. Such devices include, but are not limited to, electrophotographic devices such as copy machines, printers, and facsimile machines. The inventive rolls may be drive rolls, toner adder rolls, developer rolls, charge rolls, transfer rolls, or any component which functions as an endless member. Specific embodiments of the inventive rolls are directed to developer rolls. Such rolls, as incorporated into laser printer devices, typically supply toner to develop the latent image on a photoconducting member

EXAMPLES

Examples 1–4 below are illustrations of embodiments within the scope of the inventive graft polymer curatives suitable for use in manufacturing the inventive polyurethane elastomers and suitable as a means, alone or in conjunction with varying proportions of linear polymer curatives, of manufacturing polyurethane elastomers with hardness and compression sets desirable for particular applications. Examples 5–7 are illustrations of urethane mixtures which, when subject to conditions sufficient to effect curing, form embodiments of the inventive polyurethane elastomers. These examples should not be construed to limit the scope of either the inventive methods, polyurethane elastomers, or graft polymer curatives.

Example 1

Diol-terminated poly(n-butylacrylate) : This example illustrates an embodiment of an inventive graft polyacrylate curative comprised of a single ethylenically unsaturated monomeric species.

A solution of n-butylacrylate (600 g; 4682 mmol), 3-mercapto-1,2-propanediol (MPD) (18.22 g; 168.6 mmol), and dimethyl-2,2'-azobis-isobutyrate (1.08 g; 4.68 mmol) in 2400 ml ethylacetate is prepared, degassed, and then heated for 18 hours at 70–75° C. The solvent is removed by oven drying at 80° C. yielding the graft polymer as a colorless, highly viscous liquid.

Example 2

Diol-terminated poly(2-ethylhexylacrylate): This example illustrates an embodiment of an inventive graft polyacrylate curative comprised of a single ethylenically unsaturated monomeric species.

A solution of 2-ethylhexylacrylate (500 g; 2713 mmol), MPD (26.4g; 244.2 mmol), and dimethyl-2,2'-azobis-isobutyrate (0.625 g; 2.71 mmol) in 1500 ml ethylacetate is prepared, degassed, and then heated for 18 hours at 70–75° C. The solvent is removed by oven drying at 80° C. yielding the graft polymer as a colorless, highly viscous liquid.

Example 3

Diol-terminated poly((3-(tris(trimethylsiloxy)silyl)propyl methacrylate)-co-(poly(propylene glycol)methyl ether acrylate)): This example illustrates an embodiment of an inventive graft polymer curative comprising a copolymer system containing two or more ethylenically unsaturated monomeric species. The scope of the invention is contemplated to also include graft polymer curatives comprising copolymer systems comprising greater than two monomeric species.

A solution of 3-(tris(trimethylsiloxy)silyl)propyl methacrylate (100 g; 236.5 mmol), poly(propylene glycol)methyl ether acrylate (348.5 g; 1340 mmol), MPD (26.4 g; 244 mmol), and dimethyl-2,2'-azobis-isobutyrate (0.625 g; 2.71 mmol) in 800 mL ethylacetate is prepared, degassed, and then heated for 18 hours at 70–75° C. The solvent is removed by oven drying at 80° C. yielding the graft polymer as a pale yellow liquid.

Example 4

Diol-terminated poly(2-ethylhexylacrylate-co-2-hydroxyethylmethacrylate): This example illustrates an embodiment of the graft polymer curative that comprises side chain functionality in addition to the difunctionality of the main chain. This is accomplished via selection of at least one monomer comprising at least one additional hydroxyl, in this case, 2-hydroxyethylmethacrylate, but any such functional monomer is suitable to comprise this embodiment.

A solution of 2-ethylhexylacrylate(500 g; 2713 mmol), 2-hydroxyethylmethacrylate (26.58 g; 204.2 mmol), MPD (23.67 g; 218.8 mmol), and dimethyl-2,2'-azobis-isobutyrate (0.67 g; 2.92 mmol) in 1500 mL ethylacetate is prepared, degassed, and then heated for 18 hours at 70–75° C. The solvent is removed by oven drying at 80° C. yielding the graft polymer as a colorless, highly viscous liquid.

Table 1 summarizes the molecular weight data for the exemplar graft polymer curatives 1–4 above. Measurements were made with a Waters GPC 150C+, using THF solvent relative to polystyrene standards.

TABLE 1

| Curative | Avg. $M_w$ | Avg. $M_n$ | Avg. $M_z$ | Avg. $M_w/M_n$ |
|---|---|---|---|---|
| 1 | 6700 | 3290 | 11550 | 2.04 |
| 2 | 3265 | 2310 | 4755 | 1.41 |
| 3 | 3775 | 2445 | 5740 | 1.54 |
| 4 | 3195 | 1740 | 5530 | 1.84 |

Example 5

Polycaprolactone ester toluene-diisocyanate prepolymer (Vibrathane 6060®), trifunctional curative (Polyol TP30), linear curative (PolyG® 55–28), and Tri-isopropanolamine (TIPA) are each warmed to 75° C. and degassed in a vacuum oven prior to mixing. After mixing, the resulting urethane mixture is cast into a mold and cured at 104° C. for 30–120 minutes until the form is sufficiently cured for de-molding. The molded form is cured an additional 16 hours at 104° C. The polyurethane mixture formulation is shown in Table 2 and measured hardness (Shore A, measured according to ASTM D2240-86) and compression sets (measured according to ASTM D395-89 Method B, exposed for 22 hours at 70° C.) are summarized in Table 3.

Example 6

Same ingredients and processes as Example 5 except the relative amounts of the ingredients change as per Table 2.

Example 7

Same ingredients and processes as Examples 5 and 6, except that the Graft Curative illustrated by Example 1 is included.

TABLE 2

% Weight of Component in Example Formulation

| Component | Example 5 | Example 6 | Example 7 |
|---|---|---|---|
| Vibrathane 6060 ® | 80.14 | 71.19 | 71.32 |
| Polyol TP30 | 4.74 | 3.71 | 3.58 |
| PolyG ® 55-28 (block curative) | 15.00 | 25.00 | 15.00 |
| TIPA | 0.12 | 0.11 | 0.11 |
| Graft curative 1 | 0 | 0 | 10.00 |

TABLE 3

Physical Properties of Example Formulations

| Example | Hardness* | Compression Set** |
|---|---|---|
| 5 | 51 | 5.02 |
| 6 | 42 | 11.14 |
| 7 | 43 | 7.4 |

*Hardness measured according to ASTM D2240-86
**Compression set measured according to ASTM D395-89; method B; exposed for 22 hours at 70° C.

As shown in Table 3, increasing the amount of linear polymer curative, as in the formulation of Example 6, results in a much softer material as compared with Example 5. However, a marked increase in compression set is also observed. The addition of the inventive graft polymer curative of Example 1, as illustrated in Example 7, makes it possible to prepare a polyurethane elastomer with the same hardness but having significantly reduced compression set. Essentially, there are two ways to make the polyurethane of Example 5 softer: add a linear curative as in Example 6; or add a graft curative as in Example 7. Both additions reduce hardness, but only the polyurethane of Example 7 maintains a sufficiently low compression set.

While the invention has been described in detail with reference to specific embodiments thereof, it will be apparent to those skilled in the art that various changes and modifications may be made therein without departing from the spirit of the invention, the scope of which is defined by the following claims.

What is claimed is:

1. A method of manufacturing a graft polymer curative, the method comprising: conducting free radical polymerization of at least one ethylenically unsaturated monomer with at least one chain transfer agent or initiator, wherein the graft polymer curative has aside chain having a number average molecular weight of greater than about 500, a main chain having a number average molecular weight of less than about 200, and diol functionality on the main chain, wherein the at least one ethylenically unsaturated monomer comprises at least one acrylate, wherein the acrylate comprises 3-(tris(trimethylsiloxy)silyl)propyl methacrylate and/or poly (propylene glycol)methyl ether acrylate.

2. The method as recited in claim 1 wherein the chain transfer agent comprises a diol-functional mercaptan.

3. The method as recited in claim 2 wherein the diol-functional mercaptan chain transfer agent comprises a mercapto-substituted alkanediol.

4. The method as recited in claim 2 wherein the dial-functional mercaptan chain transfer agent comprises 3-mercapto-1,2-propanediol.

5. The method as recited in claim 1 wherein the side chain has a number average molecular weight of from greater than about 500 to about 25,000.

6. The method as recited in claim 1 wherein the side chain has a number average molecular weight of from about 1000 to about 10,000.

7. The method as recited in claim 1 wherein the graft polymer curative further comprises side chain functionality of at least one.

8. A graft polymer curative, comprising a side chain having a number average molecular weight of at least about 500, a main chain having an average molecular weight of less than about 200, and diol functionality on the main chain, wherein the graft polymer curative is formed via free radical polymerization of at least one ethylenically-unsaturated monomer with a chain transfer agent or initiator, wherein the at least one ethylenically unsaturated monomer comprises at least one acrylate, wherein the acrylate comprises 3-(tris (trimethylsiloxy)silyl)propyl methacrylate and/or poly(propylene glycol)methyl ether acrylate.

9. The graft polymer curative as recited in claim 8 wherein the chain transfer agent is a diol-functional mercaptan.

10. The graft polymer curative as recited in claim 8 wherein the side chain has a number average molecular weight of from greater than about 500 to about 25,000.

11. The graft polymer curative as recited in claim 8 wherein the side chain has a number average molecular weight of front about 1000 to about 10,000.

12. A method of manufacturing a polyurethane elastomer, the method comprising forming a polyurethane mixture comprising a urethane prepolymer; the graft polymer curative of claim 8; and optionally at least one linear polymer curative; and subjecting the mixture to conditions sufficient to effect curing; wherein the graft polymer curative comprises a side chain having a number average molecular weight greater than about 500, a main chain having a number average molecular weight less than about 200, diol functionality of the main chain, and wherein the graft polymer curative is formed via free radical polymerization of at least one ethylenically-unsaturated monomer with a mercaptan diol-functional chain transfer agent or initiator.

13. A polyurethane elastomer comprising a cured polyurethane mixture, the polyurethane mixture comprising urethane prepolymer; the graft polymer curative of claim 8; and optionally at least one linear polymer curative; wherein the graft polymer curative comprises a side chain having an average molecular weight greater than about 500, a main chain having an average molecular weight less than about 200, and diol functionality on the main chain, and wherein the graft polymer curative is formed via free radical polymerization of at least one ethylenically-unsaturated monomer with a chain transfer agent or initiator.

14. The polyurethane elastomer recited in claim 13 wherein the chain transfer agent or initiator is a diol-functional mercaptan.

15. The polyurethane elastomer as recited in claim 13 comprising from about 1 to about 30 percent by weight of the graft polymer curative.

16. The polyurethane elastomer as recited in claim 13 comprising from about 8 to about 20 percent by weight of the graft polymer curative.

17. The polyurethane elastomer as recited in claim 13 comprising from about 8 to about 12 percent by weight of the graft polymer curative.

18. A roll comprising the polyurethane elastomer as recited in claim 13.

19. The roll according to claim 18, wherein the roll is a developer roll adapted for use in electrophotographic print applications.

20. A graft polymer curative comprising a side chain having a number average molecular weight of at least about 500, a main chain having an average molecular weight of less than about 200, and diol functionality on the main chain, wherein the graft polymer curative is formed via free radical polymerization of two or more ethylenically-unsaturated monomers with a chain transfer agent or initiator, wherein the graft polymer curative comprises a copolymer system comprising poly((3-(tris(trimethylsiloxy)silyl)propylmethacrylate)-co-(poly(propylene glycol)methyl ether acrylate)).

* * * * *